June 2, 1964
G. W. RUTHERFORD
3,135,168
AUTOMATIC CLUTCH ENGAGER
Filed Aug. 14, 1961
4 Sheets-Sheet 1
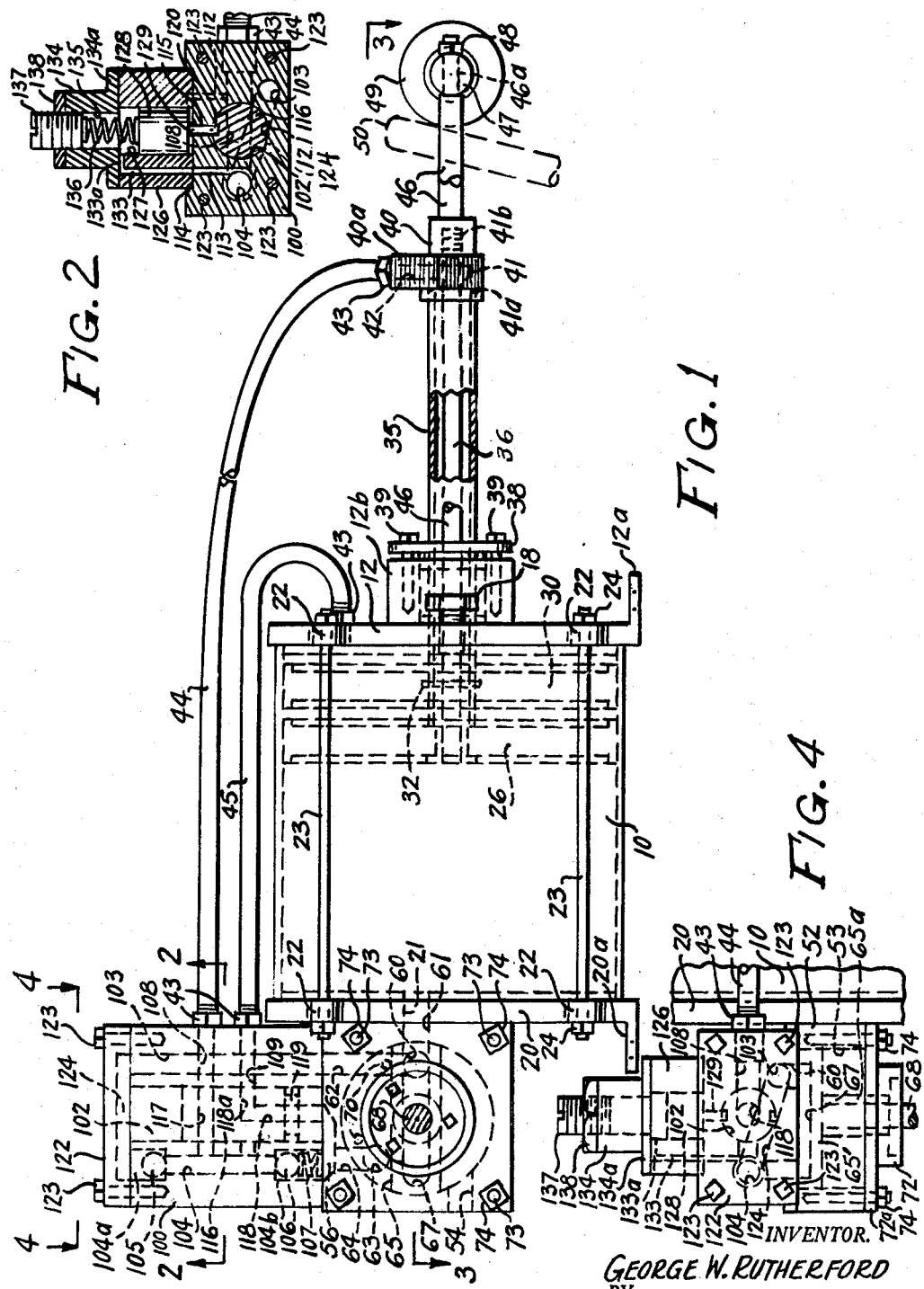
INVENTOR.
GEORGE W. RUTHERFORD
BY
Kimmel & Crowell
ATTORNEYS.

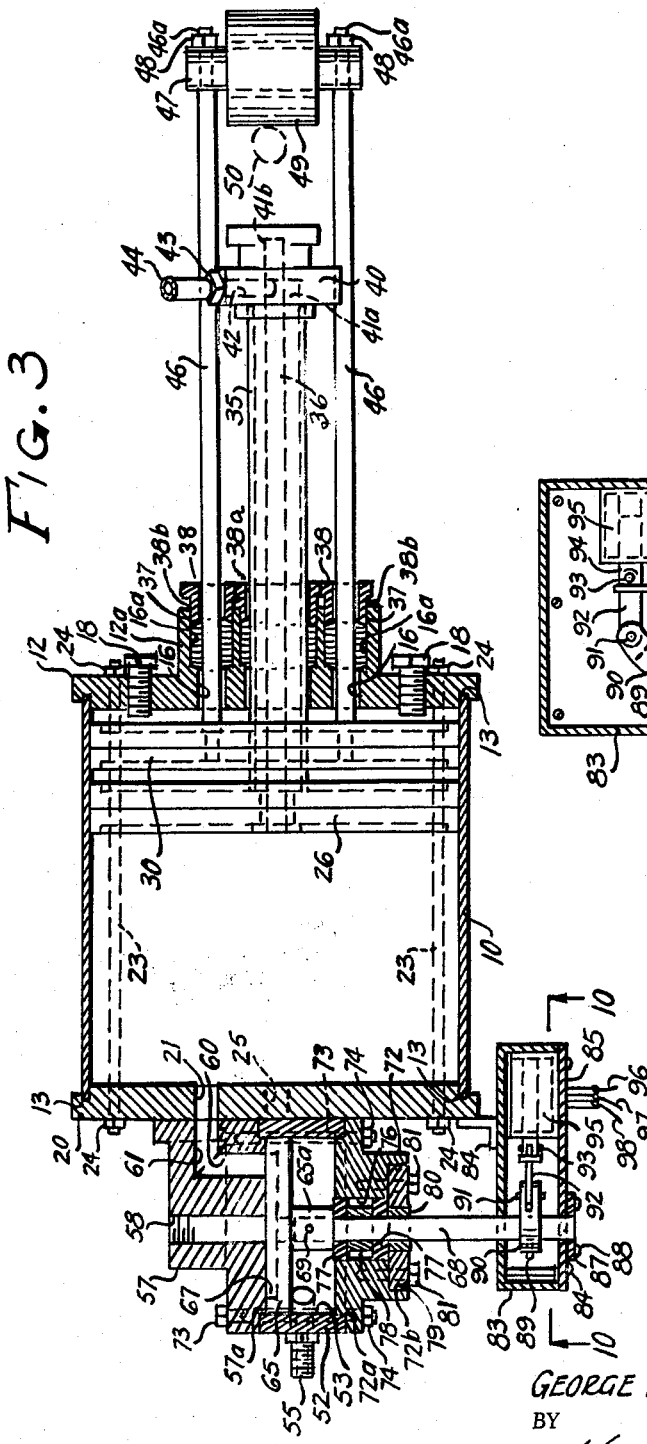

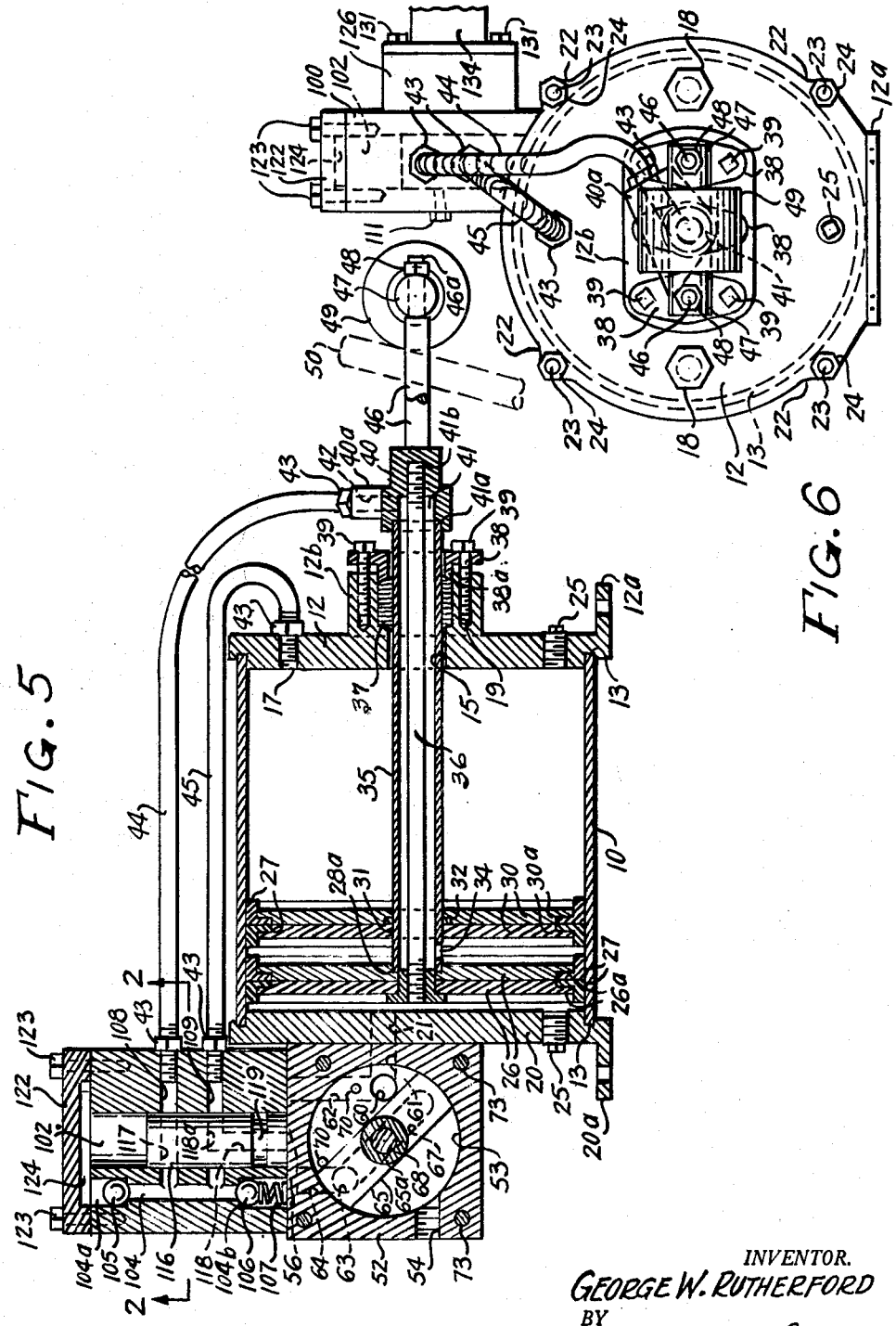

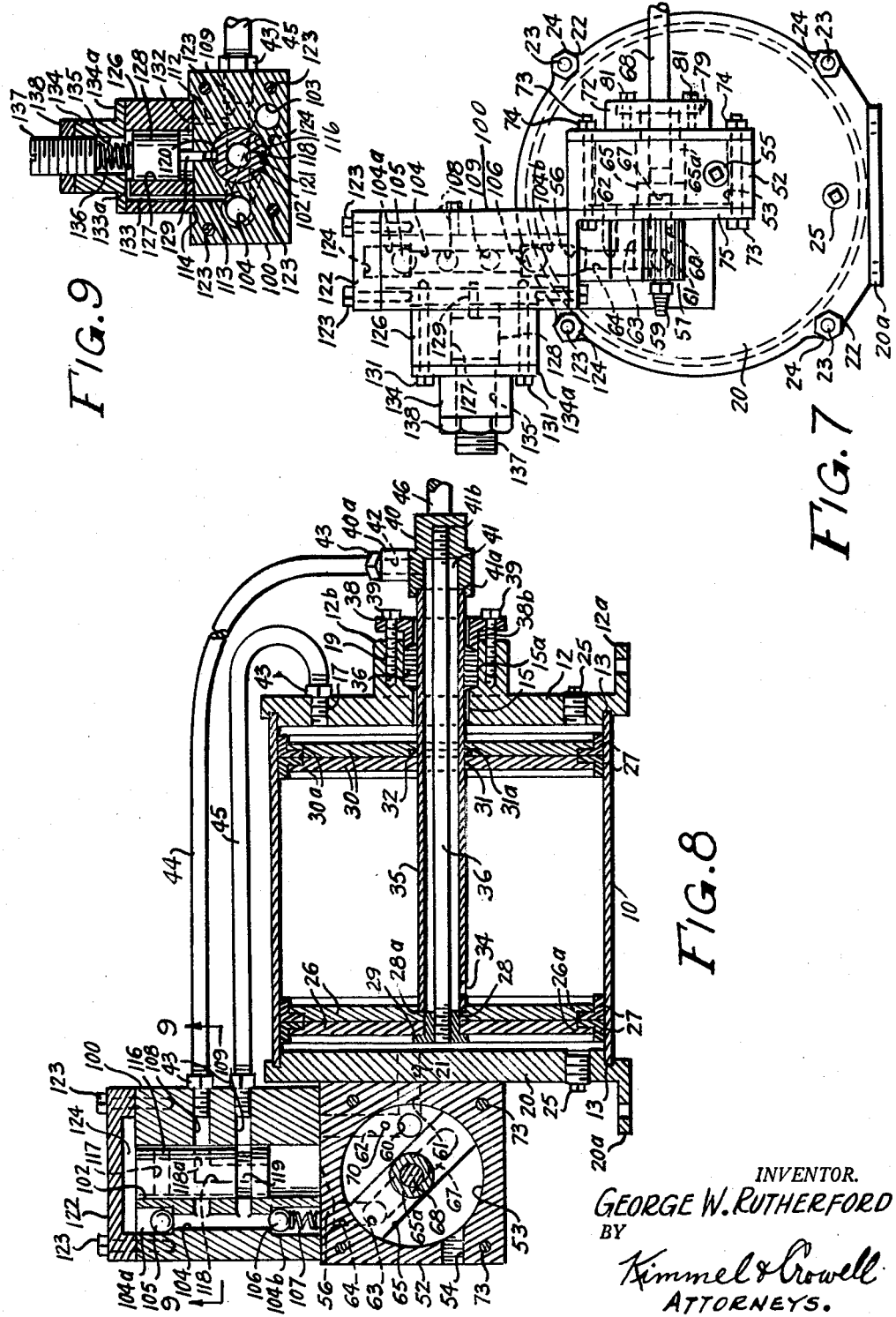

United States Patent Office 3,135,168
Patented June 2, 1964

3,135,168
AUTOMATIC CLUTCH ENGAGER
George W. Rutherford, Shreveport, La., assignor to The W. L. Somner Company, Incorporated, Shreveport, La.
Filed Aug. 14, 1961, Ser. No. 131,429
7 Claims. (Cl. 91—179)

This invention relates to an automatic fluid pressure operator for engaging and dis-engaging the clutch on a motor vehicle propelled by an internal combustion engine.

The present invention is broadly an improvement over that forming the subject matter of my prior Patent No. 2,946,318, also entitled Automatic Clutch Engager, granted on July 26, 1960.

The object of the present invention is to provide an automatic clutch engager having a fluid pressure operating cylinder for the clutch and a control valve for the cylinder, which will provide minute control of the fluid under pressure entering and leaving the cylinder.

Another object of the present invention is to provide an automatic clutch engager having a fluid pressure operating cylinder and a control valve therefor, which valve can be adjusted for precise movement of the piston in the operating cylinder from the position in which the clutch is disengaged to the position in which it is engaged.

A further object of the present invention is to provide an automatic clutch engager having a fluid pressure cylinder and a control valve therefor, which will automatically regulate the flow of the fluid while the clutch is being engaged.

Still another object of the present invention is to provide an automatic clutch engager having a fluid pressure cylinder with a pushing and a pulling piston in the cylinder, wherein the pulling piston is returned to its stop position under fluid pressure, so as to allow the clutch lever to be operated manually, if desired.

Additional objects, advantages and improvements will become apparent from the following specification, taken in connection with the accompanying drawings, in which:

FIGURE 1 is a top plan view of the automatic clutch engager, showing the fluid pressure cylinder and the control valve;

FIGURE 2 is a vertical sectional view, taken on the section line 2—2 of FIGURE 5 and looking in the direction of the arrows, showing the fluid pressure operated detent for the selector piston in the locked position of the latter;

FIGURE 3 is a side elevational view, partly in section, taken on the section line 3—3 of FIGURE 1 and looking in the direction of the arrows, showing the piston rods for the pushing piston;

FIGURE 4 is a side elevational view, taken on the line 4—4 of FIGURE 1 and looking in the direction of the arrows, showing in phantom lines the fluid passages from the control valve housing to the selector valve housing;

FIGURE 5 is a longitudinal vertical sectional view, showing the pushing and pulling pistons in clutch engaged positions;

FIGURE 6 is a front elevational view of the fluid cylinder showing the connections of the conduits from the housing for the selector piston to the latter;

FIGURE 7 is a rear elevational view of the fluid cylinder, showing the housings for the rotary control valve and the selector piston mounted on the end of the fluid pressure cylinder;

FIGURE 8 is a vertical sectional view, similar to FIGURE 5, showing the pushing and pulling pistons in clutch disengaged position;

FIGURE 9 is a view similar to FIGURE 6 taken on the section line 9—9 of FIGURE 8 and looking in the direction of the arrows, showing the fluid pressure operated detent for the selector piston in the unlocked position of the latter;

FIGURE 10 is a vertical sectional view, taken on the section line 10—10 of FIGURE 4 and looking in the direction of the arrows, showing the electromagnets for operating the control valve.

Referring now to the drawings in detail and to FIGURES 1 and 5 in particular, the fluid cylinder is here designated 10. This cylinder is mounted between parallel front and rear end plates or cylinder heads 12 and 20, respectively, which latter have annular grooves 13 in their inner faces and around their circumferences for the reception of the ends of the cylinder. The end plates 12 and 20 and the cylinder 10 are held together by stay bolts 23, which extend through suitable holes in aligned radially positioned lugs 22 on the end plates and have nuts 24 on their opposite ends. At their bottoms the end plates have integral feet 12a and 20a, respectively, by which they may be supported on any suitable structural member. Also, adjacent their bottoms drainage plugs 25 are mounted in suitable screw threaded holes in the end plates.

A pulling piston and a pushing piston are reciprocably mounted within the cylinder 10 and these pistons are of substantially identical construction. The pulling piston is comprised by a pair of abutting plates 26—26, which are shouldered at 26a on their abutting faces and adjacent their circumferences. Packing rings 27—27, which are L-shaped in cross section, each have one flange mounted between the shoulders 26a—26a on the plates 26—26, the other flanges being disposed in opposite directions along the inner wall of the cylinder 10. The pushing piston 30 is similarly constructed of two parallel plates and likewise has dual packing rings 27—27 positioned between the shoulders 30a—30a on the abutting faces of the plates. This latter piston is limited in its outward movement by engagement with two stop screws 18—18, which are mounted in suitable screw threaded holes in the front end plate 12.

The pulling piston 26 has an axial hole 28 therethrough, which is formed with a counterbore 28a in the outer face of the inner plate. A hollow piston rod 35 is received at its inner end in the counterbore 28a in the outer face of the inner plate 26. This piston rod has a hole 34 in its side wall adjacent the pulling piston 26 for the admission of fluid to the cylinder volume between the pulling piston 26 and the pushing piston 30. The pushing piston has an axial hole 31 therein, which slidably receives the hollow piston rod 35, and the outer plate 30 is formed with a counterbore 31a in its inner face concentrically positioned with respect to the hole 31. An O-type sealing ring 32 is received in this counterbore 31a and surrounds the piston rod 30, which slides through same. This latter piston rod also extends freely through an axial hole 15 in the front end plate 12. On this front end plate there is formed a substantially rectangular boss 12b, in which there is a central counterbore 15a concentrically positioned with respect to the axial bore 15 and forming a stuffing box. A packing ring 37 and the central hub 38a of a packing gland 38 are received in this counterbore. The packing gland 38 is secured in place by machine screws 39, which extend freely through holes in the flange of the packing gland and are received in suitable screw threaded holes 19 in the boss 12a.

A connector cap 40 has a central bore 41 extending part way therethrough and this bore is enlarged on the inner face of the cap by a counterbore 41a, and at its other end terminates in a reduced threaded bore 41b. A piston rod 36 is positioned centrally of the hollow piston rod 35. At its inner end this piston rod 36 is received in a flanged bushing 29, which is mounted in the axial hole 28 in the pulling piston 26; at its outer end this latter piston rod is received in the reduced threaded bore 41b in the connector cap 40. It will thus be seen that the inner piston rod 36 holds the outer piston rod 35 in place between the pulling piston 26 and the connector cap 40.

The connector cap 40 is also formed with a radially positioned boss 40a and a bore 42 therethrough, which bore communicates with the axial bore 41 through the cap. A conduit 44 of "Neoprene" rubber is connected at one end in the bore 42 by a suitable screw thread fitting 43 and at its other end by similar screw thread fitting 43 into an upper diametrically positioned bore 108 in the housing 100 for the selector valve, to be later described. Similarly, a conduit 45 is connected at one end by a screw fitting 43 into a screw threaded hole 17 in the front end plate 12 and at its other end by a screw fitting 43 into a lower diametrically positioned bore 109 in the selector valve housing.

Two piston rods 46—46 are connected to the pushing piston 30 and slidably extend through suitable holes 16—16 (FIGURE 3) along the horizontal diameter of the front end plate 12. These rods pass through stuffing boxes, which are comprised in part by counterbores 16a—16a in the boss 12a, which counterbores are concentrically formed with respect to the holes 16 in the front end plate 12. These stuffing boxes are identical with those surrounding the central piston rod 36, except as to size. Packing rings 37a—37a are received in the counterbores 16a—16t and are held in position by hubs 38b on packing glands 38. At their outer ends the piston rods 46—46 are reduced in diameter and screw threaded at 46a. A bar 47 with suitable holes therein adjacent its ends and having a cylindrical mid-section (not shown) is placed over the reduced ends 46a—46a of the piston rods and held in place by nuts 48—48. A sudden roller 49 of resilient material, such as rubber, is placed around the cylindrical mid-section of the bar 47 and the gear shift lever 50 for the motor vehicle rests against this snubber roller.

As shown in FIGURES 3 and 8, the central valve housing is comprised in part by a main body, which is a square or rectangular block 52 having a cylindrical bore at the intersection of the axes. This cylindrical bore 53 forms a valve chamber, as will be later described. The block 52 is secured to the rear end plate 20 on the fluid pressure cylinder by suitable brackets and bolts (not shown). At the lower outer corner of the block 52 there is a screw threaded bore 54, which communicates with the valve chamber 53 and is an excess fluid outlet passage. This bore 54 has a screw threaded fitting 55 therein for the connection of a conduit (not shown) which extends to the oil sump on the internal combustion engine for propelling the vehicle.

The rear wall 57 of the valve housing has a plane inner face and is formed with a shoulder 57a on its inner face, and the portion of the wall forwardly of this shoulder is received within the cylindrical bore 53 in the valve housing 52. This rear wall is formed with an axial bore 58, which is screw threaded at its outer end and is a fluid inlet passage. This axial bore 58 is adapted to receive a screw threaded fitting 59 (FIG. 7), which provides for the connection of a fluid pressure inlet conduit (not shown) to the oil pump on the internal combustion engine for propelling the vehicle. It is understood that a shut off valve (also not shown) will be placed in the fluid pressure conduit between the oil pump and the fitting 59. The rear wall 57 is also formed with a fluid passage to the cylinder 10, which is comprised by a bore 60, parallel to the axial bore 58, and which intersects an axial bore 61. This latter bore registers with a hole 21 in the rear end plate 20 on the fluid pressure cylinder. Further, the rear wall 57 is formed with a first fluid passage to the selector valve housing 100 to be later described, which passage is comprised by a vertically positioned bore 62 communicating at the lower end with the bore 60 and at its upper end with a bore 102 in the selector valve housing. In addition, the rear wall 57 is formed with a second fluid passage to the selector valve housing, which is comprised by a bore 63, also parallel to the axial bore 58, and a second vertically positioned bore 64, communicating at its lower end with the bore 63 and at its upper end with a recess 56 in the top of the rear wall. This recess 56 underlies the selector valve housing.

The rotatable member of the control valve is comprised by a plate 65 having its outer ends curved to conform to the curvature of the valve chamber 53 in the block 52. This plate 65 is integrally formed with a hub 65a, which has an axial bore 66 therethrough. A shaft 68 is received in this axial bore and extends through the hub 65a, but not through the plate 65, and is held in place by a diametrically extending pin 69 through the hub. It will be noted that the axial bore 66 through the valve plate 65 registers with the axial bore 58 in the rear wall 57 at all times, regardless of the angular position of the valve plate. The outer face of the valve plate 65 is plane and abuts the plane inner face of the rear wall 57. In this plane outer face of the plate there is formed an axially positioned channel 67, which extends throughout most of the length of the plate and at its mid-section intersects the bore 66. In one position of the rotary valve member 65, as shown in phantom lines in FIGURE 1, the channel 67 in the valve plate 65 registers at one end with the bore 60 in the rear wall 57, while the other end of the channel is closed off by the inner plane face of the rear wall 57. In this position of the valve plate 65, it abuts a first stop 70 on the inner face of the rear wall 57. In another position of the valve plate 65, as shown in FIGURES 5 and 8, the channel 67 therein registers with the bore 63 in the rear wall 57, while the other end of the channel is open to the valve chamber 53. In this latter position of the valve 65, it abuts a second stop 70, also on the inner face of the rear wall 57.

The front wall 72 of the selector valve housing is also formed with a shoulder 72a on its inner face and the portion of the wall forwardly of this shoulder is received within the cylindrical bore 53 in the valve housing 52. This front wall 72, the main body 52 of the valve housing, and the rear wall 57 are held in assembled relationship by bolts 73 having nuts 74 thereon.

A valve seating adjustment means is provided for the selector valve plate 65. The shaft 68 of the valve extends freely through an axial bore 76 in the front wall 72. Two bearing collars 77—77 freely surround the shaft 68 and are slidably received in this bore 76. The inner bearing collar 77 abuts the hub 65a on the valve plate and a spacer collar 78 is positioned intermediate the bearing collars and also freely surrounds the shaft 68. In the outer face of the wall 73 there is formed a recess or counterbore 72b. Within this counterbore there is slidably mounted a plate 79, which has an axial hole therethrough of lesser diameter than the bore 76 in the outer end wall. The outer bearing collar 77 abuts this plate 79. A guiding collar 80 is secured to the shaft 68, either by a force fit or a pin (not shown), and is slidably received in the axial hole in the plate 79. This plate 79 is slidably secured within the counterbore 72b by machine screws 81, which pass freely through suitable holes in the plate and are received in aligned screw threaded holes in the end wall 72. It will be apparent that, by taking up on the machine screws 81, thrust will be exerted through the outer bearing collar 77, the spacer collar 78 and the inner bearing collar 77 on the hub 65a of the valve plate, to force same into firm seating engagement on the plane inner face of the rear wall 57; conversely, letting out of the machine screws 81 will provide clearance between the valve plate 65 and the inner plane face of the end wall 57.

An electro-magnet operating means is provided for moving the valve plate 65 from one position, in which the channel 67 is aligned with the bore 63 in the rear wall 57 of the housing, as shown in FIGURES 5 and 8, to the other position, as shown in FIG. 1, in which the channel 67 is aligned with the bore 60.

A housing 83 is mounted on the rear end plate 20 of the fluid pressure cylinder by an angle bracket 82. A front cover plate 85 is secured to this housing by screws 84. The shaft 68 of the rotatable valve plate 65 extends freely through aligned holes in the rear wall of the housing 83 and the cover plate 85 and is journalled in a bearing 87, which is secured to the cover plate by screws 88. Within housing 83 a double arm 90 is mounted on the shaft 68 by a set screw 89. Links 92—92 are pivotally connected to the opposite ends of this arm by pins 91. At their outer ends these links 92—92 are pivotally connected by clevis joints 93—93 to the plungers 94—94 of a pair of electro-magnets 95—95. The electro-magnets 95—95 are secured to one end wall of the housing 83 in any suitable manner (not shown). Conductors 96 and 97 and 98 and 99 extend from the electro-magnets 95—95 to a suitable control switch (not shown).

It will be apparent that energization of the upper electro-magnet 95 (FIGURE 10) will partially rotate the selector valve shaft 68 in the clockwise direction; conversely, energization of the lower electro-magnet 95 will partially rotate the selector valve shaft 68 in the counter-clockwise direction.

The housing 100 for the selector piston 116 is mounted above and to one side of the selector valve housing 52, overlying the rear wall 57 of the latter however, as shown in FIGURE 7. This housing 100 is mounted on the horizontal arm of an inverted angle bracket 75 by bolts 101, which bracket is also secured to the main body 52 of the control valve housing by the same bolts 73 that hold the rear wall 57 on the latter. In the housing 100 there is formed a central axial bore 102 in which the selector piston 116 is reciprocably mounted. At its bottom this axial bore 102 partially registers with the recess 56 in the top of the rear wall 57. Also, there is formed in the housing 100, a first fluid passage, comprised by a longitudinally extending bore 103 in the side adjacent the rear end wall 20 of the fluid pressure cylinder 10, which bore, as stated above, registers with the first vertically positioned bore 62 in the rear wall 57 of the selector valve housing. Further, there is formed in the housing 100 a second fluid passage, comprised by a longitudinally extending bore 104 in the side disposed away from the rear end wall 20 of the fluid pressure cylinder 10. This bore 104 registers at its bottom with the recess 56 in the top of the rear wall 57. The bore 104 is enlarged at its upper end at 104a to form a chamber for a gravity based check valve 105, and at its lower end at 104b to form a chamber for a check valve 106, which is biased upwardly by a coiled compression spring 107. Diametrically positioned bores 108 and 109 are formed part way through the housing 100, intersecting the axial bore 102 and communicating with the second longitudinally positioned bore 104. As stated above, the conduit 44 from the connector cap 40 is secured in the bore 108 by a screw thread fitting 43 and the conduit from the front end 11 of the cylinder 10 is secured in the bore 109, also by a screw fitting 43.

The selector piston 116 is mounted for reciprocating movement in the bore 102 in the housing 100. At its mid-section this piston has a radially positioned bore 118a and from its bottom an upwardly extending axial bore 118, which intersects the bore 118a. Adjacent its bottom it has a circumferential groove 119. From a point above the circumferential groove 119, a longitudinally positioned groove 121 (FIGURES 2 and 9) extends to the top of the piston. A screw 111 (FIGURE 6) is mounted in a suitable hole in the side wall of the selector piston housing 100 and is received in the longitudinally positioned groove 121 in the selector piston 116 to constrain the latter against rotation.

The top of the housing 100 is closed by a plate 122, which is held thereon by cap bolts 123. On the under face of the plate 122 there is formed a channel or slot 124, which forms a fluid passage between the longitudinally extending bores 103 and 104 in the housing 100 for the selector piston.

The fluid pressure operated detent for this selector piston 116 is shown in FIGURES 2 and 9. A block 126 has a bore 127 therein, forming a piston chamber for a piston 128 slidably mounted in same. This block 126 is received in a suitable recess 114 in the side wall of the selector valve housing 100. On its inner face the piston 128 carries a detent 129, which is reciprocably mounted in a bore 115 at right angles to and intersecting the axial bore 102 in the housing 100. This detent 129 is adapted to seat in a recess 120 in the selector piston 116, to lock the latter against reciprocating movement. A bore 112 in the housing 100 is aligned with the outer end of a radially positioned passage 132 in the inner face of the block 126 to form a passage between the lower bore 109 in the housing 100 and the bottom of the piston chamber 127 in the block 126; similarly, a bore 113 in the housing 100 is aligned with a bore 133 in the block 126 and the latter intersects a radially positioned bore 133a in the block 126 to form a passage between the bore 104 in the selector valve housing 100 and the outer end of the piston chamber 127. On the outer end of the block 100 there is mounted a cap 134 which has a bottom flange 134a and an axial bore 135 therethrough, the latter being screw threaded at its upper end. Bolts 131 for holding the block 126 onto the selector valve housing 100 also pass through suitable holes in the flange 134a to hold the cap 134 in place. The axial bore 135 in the cap is aligned with the piston chamber 127 in the block 126 and a coiled compression loading spring 136 is mounted in the two bores. At its inner end this spring bears on the piston 128 and at its outer end against a screw 137, which is received in the outer threaded end of the axial bore 135 in the cap. A lock nut 138 is placed around the screw 137 and abuts the outer end of the cap 136 to firmly hold the cap in place.

In operation, the pulling piston 26 and the pushing piston 30 and the control valve member 65 are shown in phantom lines in FIGURE 1 in the positions in which the clutch lever 50 is in the disengaged position. The control valve member 65 is moved to this position by energization of the lower electro-magnet 95 (FIGURE 10). In this position of the rotary valve member 65, the latter abuts the first stop 70 and the channel 67 in same registers as its right end (FIGURE 1) with the passage 60 in the rear end wall 57.

Oil now flows from the fluid inlet passage 58 in the rear wall 57 through the channel 67 in the rotary control valve member 65, the horizontal passage 60 and the vertical passage 62 in the rear wall 57, the vertical passage 103 in the selector piston housing 100, the channel 124 in the top plate 122 and into the upper end of the bore 102 in the selector piston housing. The selector piston 116 is forced by the oil pressure in the upper end of the bore 102 and by gravity to its lowermost position in the bore, as shown in phantom lines in FIGURE 1. In this position it is latched by the detent 129 on the piston 128 engaging in the recess 120 in the selector piston. The oil in the bottom of the bore 102 below the selector piston 116 escapes through the recess 56 and the vertical passage 64 and horizontal passage 63 in the rear wall 57, and into the valve chamber 53. Fluid pressure is then built up in the valve chamber. Oil also flows into the fluid cylinder 10 from the channel 67 in the rotary valve member 65, the horizontal passages 60 and 61 in the rear wall 57, and the hole 21 in the rear end plate of the cylinder. Fluid pressure is thus built up in the cylinder 10 between the pulling piston 26 and the rear end plate 20. The oil admitted to the cylinder 10 drives the pulling piston 26 to the front end of the cylinder, to the position shown in phantom lines in FIGURE 1. As the pulling piston 26 moves to the stated position, the piston rod 35 shifts the clutch lever 50 rearwardly (FIGURE 1) to the clutch disengaged position. During the rearward movement of the pulling piston 26 the oil in the cylinder volume 10 between the pulling piston 26 and the pushing piston 30 is expelled through the hole 34 in the hollow piston rod itself, the connector cap 40, the conduit 44, the upper horizontal passage 108 in the selector piston housing 100, the diametral passage 117 in the selector piston 116, the vertical passage 104 in the selector piston housing, past the spring biased check valve 106, through the vertical passage 64 into the cylinder, driving the pushing piston 25 ahead of same. The rods 46—46 carry the clutch lever 50 forwardly to the clutch engaged portion.

As the pushing piston 30 and the pulling piston 26 move together toward the rear end of the cylinder 10, the oil in the cylinder volume between the pulling piston 26 and the rear end plate 20 is expelled through the hole 21 in the rear end plate, horizontal passages 61 and 60 in the rear wall 57, and over the rotary valve member 65 into the valve chamber 53. As before, the oil passes through the fluid outlet passage 54 in the control valve housing 52 and the conduit (not shown) therein to the oil sump on the internal combustion engine.

The oil flowing through the axial bore 118 and the radial bore 118a in the selector piston 116, the lower horizontal bore 109 in the selector piston housing 100 and the conduit 45 also flows in part through the passage 112 (FIGURE 2) in the selector piston housing 100 and the passage 132 in the block 126 and into the bore 127 beneath the piston 128 in the latter. When the oil pressure in the cylinder volume 10 between the pulling piston 30 and the front end plate 12 and in the bore 127 in the block 126 has become sufficient to overcome the force of the compression spring 136, the piston 128 will be moved outward and the detent 129 thereon become disengaged from the recess 120 in the selector piston 116. As the piston 128 moves outward, the oil in the bore 137 between the outer face of the piston and the cap 134 escapes through the passages 133a and 133 in the block 126, the passage 113 and into the passage 104 in the selector piston housing 100. The degree of oil pressure at which the piston 128 will move outward against the force of the compression spring 136 can be regulated by adjusting the screw 137 in the cap 136. The selector piston 116 is now freed and will be moved upward by the oil pressure in the bottom of the bore 102 in the selector piston housing 100, to the position shown in FIGURE 8. The oil in the bore 102 above the selector piston 116 escapes through the channel 124 in the top plate 122, the vertical passage 103 in the selector piston housing 100, the aligned vertical passage 62 and the horizontal passage 60 in the rear wall 57 and into the valve chamber 53.

With the selector piston 116 in the postion stated, oil now flows from the fluid inlet passage 58 in the rear wall 57 through the channel 67 in the rotary control valve member 65, the horizontal passage 63 and the vertical passage 64 and the recess 56 in the rear wall 57, the lower part of the bore 102 in the selector piston housing 100, the axial bore 118 and the radial bore 118a in the selector piston 116, the upper horizontal passage 108 in the selector piston housing, the conduit 44, the connector cap 40, the hollow piston rod 35, and the hole 34 in the latter and into the cylinder volume 10 intermediate the pulling piston 26 and the pushing piston 30. The pushing piston 30 is now forced to the front end of the cylinder 10 adjacent the front end plate 12. With the pushing piston 30 in this position and the pulling piston 26 at the rear end of the cylinder 10, as shown in FIGURE 8, the clutch lever 50 may be operated manually.

As the pushing piston 30 moves to the position stated, the oil in the cylinder volume 10 intermediate the pushing piston 30 and the front end plate 12 is expelled through the hole 17 in the front end wall, the conduit 45, the lower horizontal bore 109 in the selector piston housing 100, the annular groove 119 around the selector piston 116, the vertical passage 104 in the selector piston housing, past the gravity seated check valve 105, through the channel 124 in the top plate 122, the vertical passage 103 in the selector valve housing, the aligned vertical passage 62 and the horizontal passage 60 in the rear wall 57, and over the rotary control valve member 65 and into the valve chamber 53. As in the previous cases, the oil in the valve chamber 53 passes through the fluid outlet passage 54 to the oil sump (not shown) on the internal combustion engine.

The final stage of operation involves the movement of the pulling piston 26 from the full line position shown in FIGURE 8 to the position shown in phantom lines in FIGURE 1, wherein, as above stated, the clutch lever 50 is in its dis-engaged position. As before stated, the rotary control valve member 65 is moved back against the first stop 70, to the position shown in phantom lines in FIGURE 1, this movement being effected by energization of the lower electro-magnet 95 (FIGURE 10). Oil now flows from the fluid inlet passage 58 through the channel 67 in the rotary control valve member 65, the horizontal passage 60 and the vertical passage 62 in the rear plate 57, the aligned vertical passage 103 in the selector piston housing 100, the channel 124 in the top plate 122, and into the top of the bore 102 in the selector piston housing. The selector piston 116 is moved downward by the oil pressure and the force of gravity, to the position shown in full lines in FIGURE 5 and in phantom lines in FIGURE 1. In this position the spring 136 forces the piston 128 inward to engage the detent 129 in the recess 122 in the selector piston 116 to latch the latter in the position shown. The oil in the bore 127 between the inner face of the piston 128 and the recess 114 in the selector piston housing 100 escapes through the passage 132 in the block 126 and the bore 112 and into the passage 109 in the selector piston housing 100. Also, the oil in the bore 102 in the selector piston housing below the selector piston 116 escapes through the recess 56 and the vertical passage 64 and the horizontal passage 63 in the rear wall 57 and over the rotary control valve member 65 into the valve chamber 53.

Oil also flows from the fluid inlet 58 in the rear wall 57 through the channel 67 in the rotary control valve member 65, the horizontal passages 60 and 61 in the rear wall 57 through the hole 21 in the rear end plate 20 in the cylinder column 10 between the pulling piston 26 and the rear end plate. The pulling piston 26 is forced by the oil pressure to the front end of the cylinder 10, in the position shown in phantom lines in FIGURE 1. As the pulling piston 26 moves to the position stated, the piston rod 35 pushes the clutch lever 50 rearwardly to disengage the clutch. During the movement of the pulling piston to the front end of the cylinder 10, oil in the cylinder volume intermediate the pushing piston and the pulling piston 30 is expelled through the hole 34 in the hollow piston rod 35, the piston rod itself, the connector cap 40, the conduit 44, the upper horizontal bore 108 in the selector piston housing 100, the diametral bore 117 in the selector piston 116, the vertical passage 104 in the selector piston housing, past the spring biased check valve 106, through the aligned vertical passage 64 and the horizontal passage 63 in the rear wall 57 and over the rotary control valve member 65 and into the valve chamber 53. As in the other and the control valve housings for admitting fluid to the cylinder volume between the second piston and the other end of the cylinder in one position of the control valve and for discharging fluid from the said cylinder volume between the second piston and the other end of the cylinder in another position of the control valve.

5. In a fluid pressure shifting apparatus for the clutch lever of a transmission, comprising a cylinder, a first piston reciprocably mounted in said cylinder, a second piston reciprocably mounted in said cylinder, a hollow piston rod connected to the first piston and slidably extending through the second piston and one end wall of the cylinder, rod connecting the second piston to the clutch lever, a control valve housing having a plane inner face, a central passage therein for the admission of fluid under pressure and additional outlet passages in the plane inner face, a rotary valve member having a fluid channel therein aligned with the central passage and selectively alignable with the latter outlet passages, means on said control valve housing for adjusting the seating of the rotary valve member against the plane inner face of the control valve housing, a fluid pressure connection to the control passage in the control valve housing, a selector piston housing, a selector piston reciprocably mounted in said latter housing, a passage in the control valve housing connecting one of the latter fluid passages therein to one end of the cylinder for admitting fluid to and discharging same from the cylinder volume between the first piston and the latter end of the cylinder, a passage in the selector piston housing communicating with said latter passages in the control valve housing and a first conduit connected in the latter passage at one end and to the hollow piston rod at its other end for admitting fluid to and discharging same from the cylinder volume intermediate the pistons, a passage in the control piston housing communicating with another of the latter passages in the control valve housing and a second conduit connected in the latter passage at one end and to the other end of the cylinder at its opposite end for admitting fluid to and discharging same from the cylinder volume between the second piston and the said other end of the cylinder.

6. A fluid pressure operated shifting apparatus for the clutch lever of a transmission comprising a cylinder, a first piston reciprocably mounted in said cylinder, a second piston reciprocably mounted in said cylinder, a hollow rod connected to the first piston and slidably extending through the second piston and one end wall of the cylinder, rods connecting the second piston to the clutch lever, a control valve having a valve chamber therein, oil pressure connections to and oil discharge connections from the control valve housing, a selector piston housing, a selector piston reciprocably mounted in said housing, a passage in the control valve housing and the selector piston housing interconnecting the end of the cylinder volume between the first piston and one end of the cylinder, the valve chamber in the control valve housing and the selector piston, a passage in the selector piston housing and control valve housing and a first conduit secured at one end in said passage and at its opposite end to the hollow piston rod interconnecting the cylinder volume intermediate the pistons, the selector piston and valve chamber in the control valve housing, a passage in the selector piston housing and control valve housing and a second conduit connected in the latter passage at one end and to the other end of the cylinder at its opposite end interconnecting the cylinder volume between the second piston and the other end of the cylinder, the selector piston and the valve chamber in the control valve housing, and a control valve in the valve chamber of the control valve housing automatically shiftable from a first position in which fluid under pressure is admitted to the cylinder volume between the first piston and one end of the cylinder, to a second position, in which fluid is discharged from the latter cylinder volume and fluid under pressure is admitted to the cylinder volume intermediate the pistons, and to the cylinder volume between the second piston and the other end of the cylinder, and automatically shiftable back to the first position in which fluid is discharged from the latter cylinder volume and fluid under pressure is admitted to the cylinder volume between the first piston and the first end of the cylinder.

7. A fluid pressure shifting apparatus for the clutch lever of a transmission, comprising a cylinder, a first piston reciprocably mounted in said cylinder, a second piston reciprocably mounted in said cylinder, a hollow piston rod connected to the first piston and slidably extending through the second piston and one end wall of the cylinder, rods on said second piston engageable with the clutch lever, a control valve housing having a central fluid inlet passage and a plurality of additional fluid passages therein, a fluid connection to said inlet passage, a shaft rotatably mounted in said control valve housing, a rotatable valve member in said control valve housing aligned with the central fluid inlet passage and selectively alignable with the additional fluid passages, a first electromagnet connected to said shaft for partially rotating same in one direction, a second electro-magnet connected to said shaft for partially rotating same in the opposite direction, a first passage in the selector piston housing communicating with a first of the latter passages in the control valve housing, a first conduit connected between the first passage in the control valve housing and one end of the cylinder for admitting fluid between the second piston and one end of the latter, a second passage in the selector piston housing also communicating with the first of the latter passages in the control valve housing, a second conduit connected between the latter passage in the selector piston housing and to the hollow piston rod for admitting fluid between the pistons, and a passage in the other end of the cylinder and the control valve housing communicating with a second of the latter passages in the control valve housing for admitting fluid to the cylinder between the latter end of same and the first piston.

References Cited in the file of this patent

UNITED STATES PATENTS

| | | |
|---|---|---|
| 2,434,351 | Courtemanche | Jan. 13, 1948 |
| 2,596,471 | Densmore et al. | May 13, 1952 |
| 2,946,318 | Rutherford | July 26, 1960 | stages of operation described above, the oil in the valve chamber 53 flows through the fluid outlet passage 54 and the conduit (not shown) therein to the oil sump on the internal combustion engine. Also during the movement of the pulling piston 26 to the front of the cylinder 10, the oil flowing from the cylinder volume intermediate the pulling piston 26 and the pushing piston 30 through the conduit 44, the upper horizontal passage 108 in the selector piston housing 100, the diametral bore 117 in the selector piston 116, and the vertical passage 104 in the selector piston housing, also flows in part through the passage 113 (FIGURE 2) in the selector piston housing, the aligned passage 133 and connecting passage 133a in the block 126 and into the bore 127 outwardly of the piston 128 in the latter. The oil pressure thus developed in the bore 137 assists the spring 136 in holding the detent 129 on the piston 128 in the recess 122 in the selector piston 116.

Having now fully described my invention, what I claim as new and useful and desire to secure by Letters Patent of the United States is:

1. A fluid pressure operated shifting apparatus for the clutch lever of a transmission comprising a cylinder, a first piston reciprocably mounted in said cylinder, a second piston reciprocably mounted in said cylinder, a hollow piston rod connected to the first piston and slidably extending through the second piston and one end of the cylinder rods connecting the second piston to the clutch lever, a control valve housing, a control valve mounted in said housing, oil pressure connections to and oil dicharge connections from the control valve housing, a selector piston housing, a selector piston reciprocably mounted in said latter housing, a passage through the other end wall of the cylinder and the control valve housing for admitting fluid to and discharging same from the cylinder volume between the first piston and one end of the cylinder, a passage through the control valve housing and the selector piston housing and a first conduit connected in the latter passage at one end and to the hollow piston rod at its other end for admitting fluid to and discharging same from the cylinder volume intermediate the pistons, and a second conduit and a passage in the selector piston housing and the control valve housing for admitting fluid to and discharging same from the cylinder volume between the second piston and the other end of the cylinder.

2. A fluid pressure operated shifting apparatus for the clutch lever of a transmission comprising a cylinder, a first piston reciprocably mounted in said cylinder, a second piston reciprocably mounted in said cylinder, a hollow piston rod connected to the first piston and slidably extending through the second piston and one end of the cylinder, rods connecting the second piston to the clutch lever, a control valve housing, a control valve mounted in said housing, oil pressure connections to and oil discharge connections from the control valve housing, a selector piston housing, a selector piston reciprocably mounted in said latter housing, an auxiliary housing mounted on said second housing, a piston reciprocably mounted in said auxiliary housing, a detent carried by said latter piston and engageable with the selector piston to lock same in position, a passage through the other end wall of the cylinder, the control valve housing and the selector piston housing for admitting fluid to and discharging same from the cylinder volume between the first piston and one end of the cylinder, a passage through the control valve housing and the selector piston housing, and a first conduit connected in the latter passage at one end and to the hollow piston rod at its other end for admitting fluid to and discharging same from the cylinder volume intermediate the pistons, a second conduit and a series of passages in the selector piston housing and the control valve housing for admitting fluid to and discharging same from the cylinder volume between the second piston and the other end of the cylinder, a series of passages in the control valve, selector piston and auxiliary housings for admitting fluid from the first cylinder volume to the auxiliary housing on one side of the piston and a second series of passages in the control valve, selector piston and auxiliary housings communicating with said second conduit for admitting fluid from the cylinder volume on the opposite side of the first piston to the auxiliary valve housing on the other side of the piston.

3. A fluid pressure operated shifting apparatus for the clutch lever of a transmission comprising a cylinder, a first piston reciprocably mounted in said cylinder, a second piston reciprocably mounted in said cylinder, a hollow piston rod connected to the first piston and slidably extending through the second piston and one end wall of the cylinder, a hollow piston rod connected to the first piston and slidably extending through the second piston and one end of the cylinder, rods connecting the second piston to the clutch lever, a control valve housing, a control valve mounted in said housing, oil pressure connections to and oil discharge connections from the control valve housing, a selector piston housing, a selector piston reciprocably mounted in said latter housing, an auxiliary housing mounted on said second housing, a piston reciprocably mounted in said auxiliary housing, a loading spring in said auxiliary housing engaging said latter piston, a screw extending through the auxiliary housing and engaging the loading spring for varying the force exerted by the latter on the piston, a detent carried by said latter piston and engageable with the selector piston to lock same in position, a passage through the other end wall of the cylinders, the control valve housing and the selector piston housing for admitting fluid to and discharging same from the cylinder volume between the first piston and one end of the cylinder, a passage through the control valve housing and a first conduit connected in the latter passage at one end and to the hollow piston at its other end for admitting fluid to and discharging same from the cylinder volume intermediate the pistons, a second conduit and a passage in the selector piston housing and the control valve housing for admitting fluid to and discharging same from the cylinder volume between the second piston and the other end of the cylinder, a series of passages in the control valve, selector piston and auxiliary housings for admitting fluid from the first cylinder volume to the auxiliary housing on one side of the piston and a second series of passages in the control valve, selector piston, and auxiliary housings communicating with one of said conduits for admitting fluid from the cylinder volume on the opposite side of the first piston to the auxiliary valve housing on the other side of the piston.

4. A fluid pressure operated shifting apparatus for the clutch lever of a transmission comprising a cylinder, a first piston reciprocably mounted in said cylinder, a second piston reciprocably mounted in said cylinder, a hollow piston rod connected to the first piston and slidably extending through the second piston and one end wall of the cylinder rods connecting the second piston to the clutch lever, a control valve housing, a control valve mounted in said housing, a selector piston housing, a selector piston reciprocably mounted in said latter housing, a passage through the other end wall of the cylinder, the control valve housing and the selector piston housing for admitting fluid to the cylinder volume between the first piston and one end of the cylinder in one position of the control valve and discharging same from said end of the cylinder in another position of the control valve, a passage through the control valve housing and a first conduit connected in the latter passage at one end and to the hollow piston rod at its other end for admitting fluid to the cylinder volume intermediate the pistons in one position of the control valve and discharging same from the cylinder volume intermediate the pistons in another position of the control valve and at the same time allowing the clutch lever to be operated manually, a second conduit and passage in the selector piston housing